United States Patent [19]

Debesis

[11] 4,377,814

[45] Mar. 22, 1983

[54] INK JET PRINTING MACHINE

[75] Inventor: John R. Debesis, Penfield, N.Y.

[73] Assignee: Xerox Corporation, Stamford, Conn.

[21] Appl. No.: 255,017

[22] Filed: Apr. 17, 1981

[51] Int. Cl.[3] .......... G01D 15/18

[52] U.S. Cl. .......... 346/140 R; 346/75

[58] Field of Search .......... 346/75, 140 IJ, 140 PD

[56] References Cited

U.S. PATENT DOCUMENTS

| | | | |
|---|---|---|---|
| 3,693,179 | 9/1972 | Skala | 346/140 PD X |
| 4,032,929 | 6/1977 | Fishbeck et al. | 346/140 PD |
| 4,057,807 | 11/1977 | Fishbeck et al. | 346/140 PD |
| 4,243,995 | 1/1981 | Wright et al. | 346/140 PD |
| 4,303,927 | 12/1981 | Tsao | 346/75 |
| 4,326,206 | 4/1982 | Raschke | 346/140 PD |

*Primary Examiner*—George H. Miller, Jr.

[57] ABSTRACT

An ink jet printing machine in which adjacent nozzles are isolated from one another to prevent energization of a nozzle other than a selected nozzle.

4 Claims, 6 Drawing Figures

INK JET PRINTING MACHINE

This invention relates generally to ink jet printing, and more particularly concerns isolating adjacent ink jet nozzles from one another to prevent interaction therebetween.

Generally, an ink jet printing machine has an array of small nozzles with each nozzle having a chamber containing ink associated therewith. Upon excitation, an electromechanical transducer varies the volume of the chamber producing a temporary increase in pressure forcing a droplet of ink to be ejected from the corresponding nozzle. These individual droplets of ink are sprayed onto a copy sheet. One column of vertical drops is referred to as a scan. If, in forming a character, a particular space in a scan is to be left blank, the transducer associated with the appropriate nozzle remains deenergized and a droplet of ink is not ejected from the nozzle. Thus, drops of ink are deposited in appropriate positions on the copy sheet to form the desired character. Ink jet printing machines of this type are described in U.S. Pat. No. 3,683,212 issued to Zoltan in 1972; U.S. Pat. No. 3,747,120 issued to Stemme in 1973; U.S. Pat. No. 3,832,579 issued to Arndt in 1974; and U.S. Pat. No. 3,871,004 issued to Rittberg in 1975.

One of the problems in a printing machine of this type is excitation of the transducer associated with a selected nozzle frequently introduces cross-coupling between adjacent nozzles. Thus, not only may the desired nozzle be excited, but other nozzles adjacent thereto also may be excited.

Various approaches have been devised to improve ink jet printing, the following disclosures appear to be relevant:

U.S. Pat. No. 4,032,929
Patentee: Fischbeck et al.
Issued: June 28, 1977

U.S. Pat. No. 4,057,807
Patentee: Fischbeck et al.
Issued: Nov. 8, 1977

U.S. Pat. No. 4,243,995
Patentee: Wright et al.
Issued: Jan. 6, 1981

The pertinent portions of the foregoing disclosures may be briefly summarized as follows.

Fischbeck et al. ('929) discloses a multiple nozzle unit having an ink supply chamber. A piezoelectric layer is excited to deform or decrease the volume of the respective chamber to cause a droplet of ink to be ejected from the nozzle.

Fischbeck et al. ('807) describes an ink jet assembly in which excitation of an electromagnet deforms a diaphragm to decrease the volume of an ink chamber. Decreasing the volume of the chamber causes ink to be ejected from a nozzle in communication therewith.

Wright et al. describes an ink jet recording system in which a piezoelectric transducer is positioned partially in the ink channel. The piezoelectric transducer expands when excited acting like a piston to eject ink from the nozzle.

In accordance with the features of the present invention, there is provided an ink printing machine including an array of nozzles with means for storing a supply of writing fluid for each nozzle. Means are provided for energizing selected nozzles of the array of nozzles to eject spaced droplets of writing fluid therefrom. Means isolate the nozzles from one another to prevent interaction between the nozzles from energizing nozzles other than the selected nozzles of the array of nozzles.

Other aspects of the present invention will become apparent as the following description proceeds and upon reference to the drawings, in which:

FIG. 5(*b*) is an elevational view illustrating another embodiment of the corrugated members depicted in FIG. 4.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
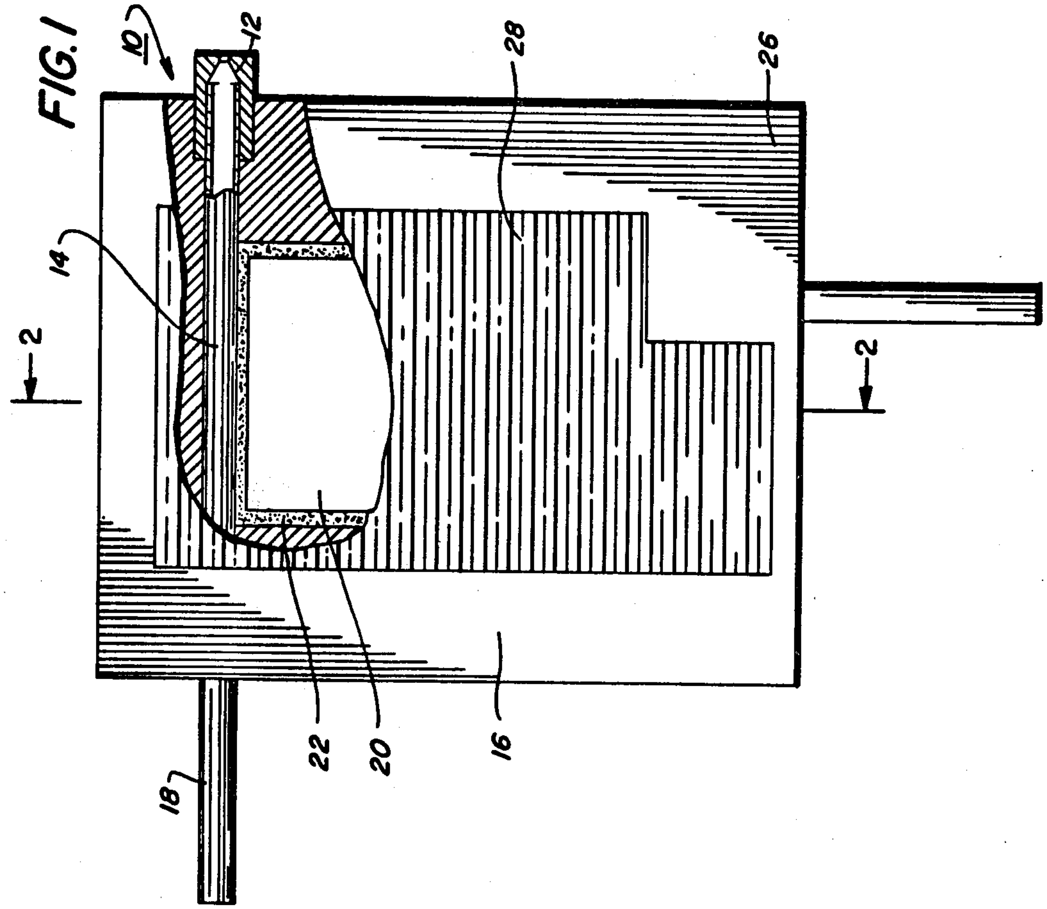
FIG. 1 is an elevational view, partially in section, depicting an ink jet module of the present inventions.

For a general understanding of the ink jet printing machine incorporating the features of the present invention therein, reference is made to the drawings. In the drawings, like reference numerals have been used throughout to designate identical elements. FIG. 1 schematically depicts an ink jet module incorporating the components of the present invention therein. Although the present invention is particularly well adapted for use in ink jet printing, it will become evident from the following discussion that it is equally well suited for use in a wide variety of devices and is not necessarily limited in its application to the particular embodiment shown herein.

Referring now to FIG. 1, there is shown an ink jet module arranged to eject droplets of writing fluid or ink therefrom. The ink jet module is indicated generally by the reference numeral 10. Ink jet module 10 includes a nozzle 12 in communication with tube 14 in housing 16. An inlet portion 18 of tube 14 is connected to a supply of writing ink. A piezoelectric transducer 20 is positioned closely adjacent tube 14. Piezoelectric transducer 20 is encapsulated in an elastomeric material such as urethane 22. An electric voltage pulse generator (not shown) is connected to piezoelectric transducer 20 by electrical lead wire 24. Excitation of piezoelectric transducer 20 causes tube 14 to be compressed or restricted in size. In this way, a droplet of ink or writing fluid is ejected from nozzle 12. Preferably, piezoelectric transducer 20 is made from piezoelectric PZT-5, available from Vernitron Piezoelectric Division, Bedford, Ohio.

Figure 2:
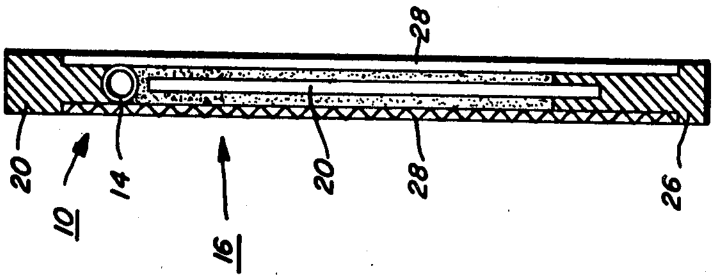
FIG. 2 is a sectional elevational view taken in the direction of the arrows 2—2 of FIG. 1.

Turning now to FIG. 2, there is shown ink jet module 10 in section taken in the direction of arrows 2—2 of FIG. 1. As shown thereat, housing 16 includes a frame 26, preferably formed by casting a plastic material, such as urethane. Piezoelectric transducer 20 is at least partially secured to frame 26. Nozzle 12 is also secured to frame 26. A pair of plates 28 enclose frame 26 with piezoelectric transducer 20 being disposed therebetween. Preferably, plates 28 are made from steel.

Figure 3:
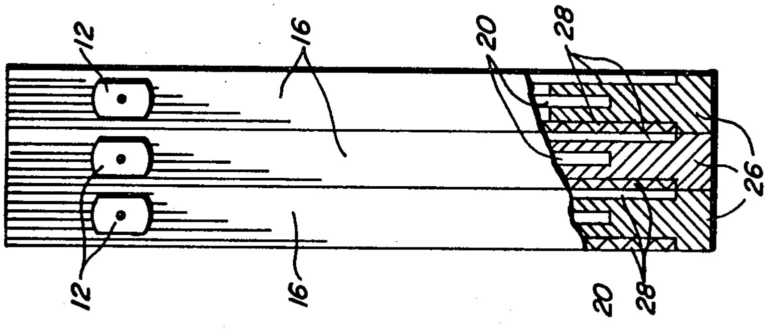
FIG. 3 is an elevational view, partially in section, showing an array of ink jet modules.

As shown in FIG. 3, a linear array of ink jet modules are formed by placing each ink jet module of FIG. 2 adjacent to one another. As shown in FIG. 3, plates 28 are corrugated. In this way, adjacent ink jet assemblies are isolated from one another. This is achieved by the corrugations forming air spaces between adjacent modules. The air between adjacent ink jet modules acts as a damping medium. The corrugations insure that there is no surface to surface contact between adjacent ink jet modules, but rather a plurality of point contacts. Hence, when one of the ink jet modules is actuated by energizing a selected piezoelectric transducer, adjacent ink jet modules remain de-activated, i.e. there is no cross coupling between the adjacent ink jet modules or interaction therebetween due to the isolation provided by corrugated plates 28.

Figure 4:
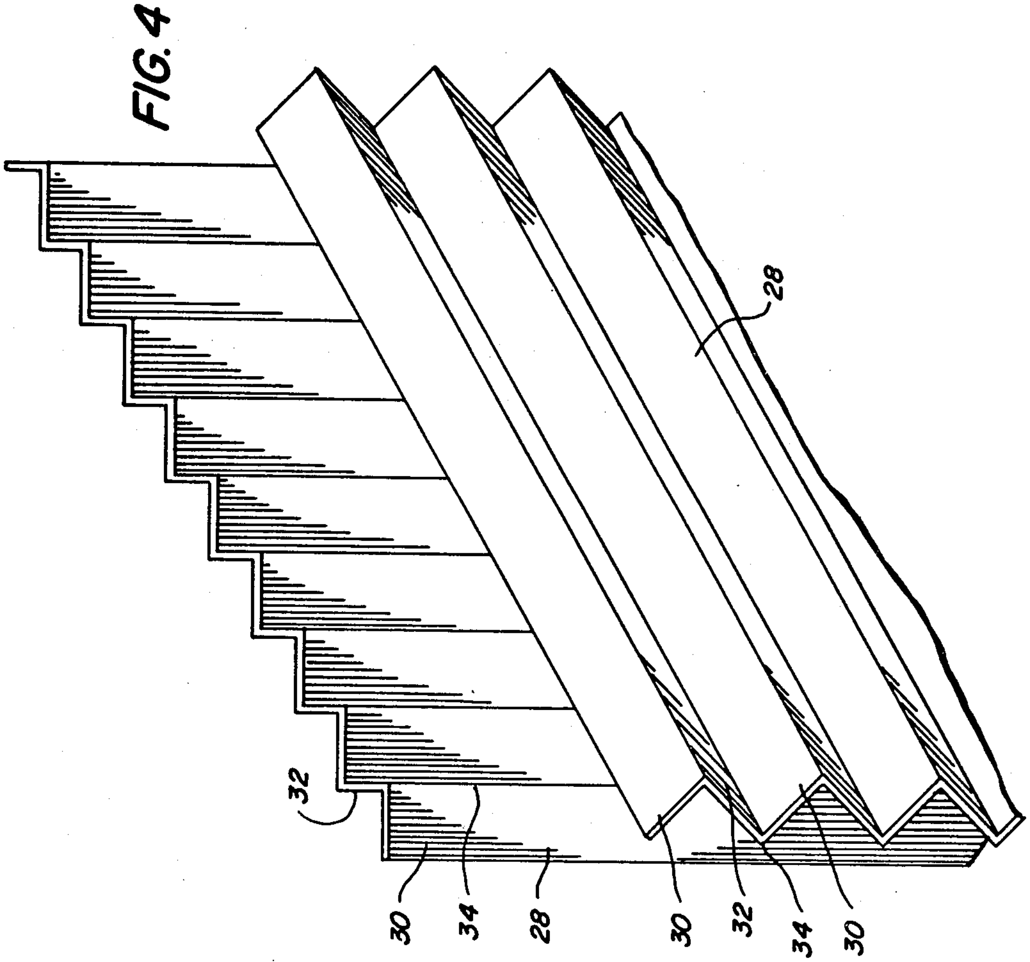
FIG. 4 is a fragmentary perspective view illustrating the corrugated members for isolating adjacent ink jet modules from one another.

Turning now to FIG. 4, there is shown a fragmentary perspective view of the plates 28. Each plate 28 is corrugated. Thus, a wall 30 of plate 28 intersects with a wall 32 thereof at an apex 34. A plurality of apexes of a plate of one module contact the apexes of the plate of the next adjacent ink jet module. Thus, each plate is a corrugated member comprising a series of triangular members connected to one another. The axis formed by the apexes of one plate are substantially normal in direction to the axis formed by apexes of the next adjacent plate. In this way, a series of multiplicity of point contacts between adjacent ink jet modules occur rather than surface or area contact therebetween. Air is interposed between adjacent ink jet modules to provide damping therebetween. Preferably, wall 30 intersects wall 32 of plate 28 at a 90° angle at apex 34.

Figure 5A:
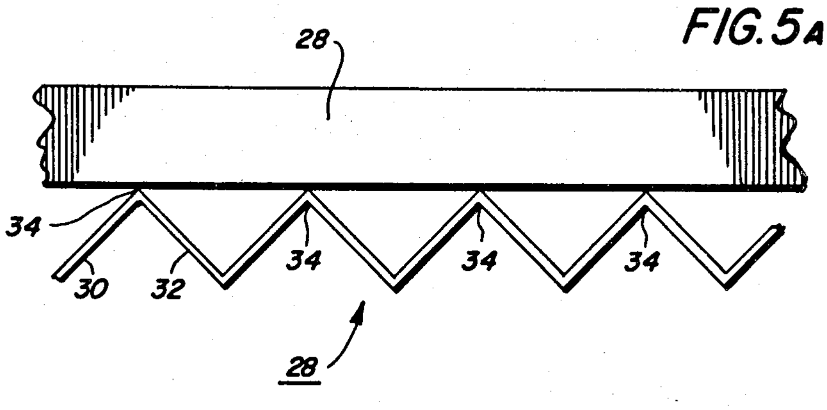
FIG. 5(*a*) is an elevational view showing one embodiment of the corrugated members depicted in FIG. 4.
Figure 5B:
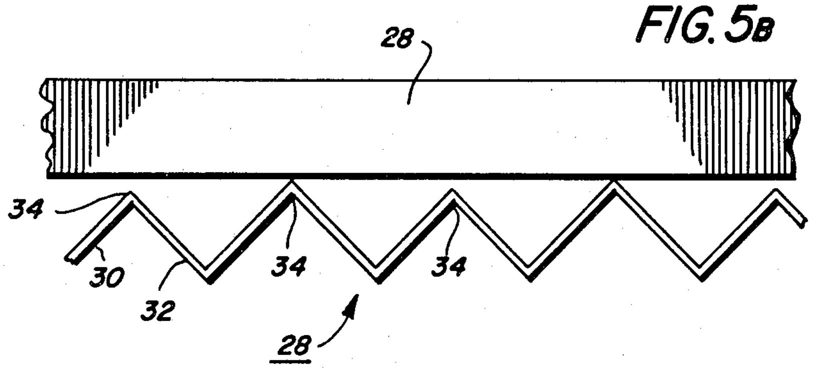

FIG. 5(*a*) depicts one embodiment of the relationship between adjacent plates 28. As shown thereat, all of the walls 30 and 32 of each plate 28 intersect at the same angle at apex 34. As previously indicated, this angle is preferably 90°. Under these circumstances, all of the apexes 34 of one wall 28 will contact all of the apexes of the next adjacent wall.

Alternatively, as shown in FIG. 5(*b*), walls 30 and 32 may intersect one another at apexes 34 at different angles or the walls may be of different lengths. Under these circumstances, a plurality of apexes 34 will be spaced from the next adjacent plate 28. Thus, only periodic apexes 34 will contact the next adjacent plate 28. This further minimizes interaction between adjacent ink jet modules in that the contact therebetween is further reduced and more damping provided. The greater damping is introduced by the increase in air between adjacent plates 28. Moreover, the contact between adjacent plates 28 is greatly reduced in that contact will occur only periodically along discreet points rather than at each apex as is shown in FIG. 5(*a*).

One skilled in the art will appreciate that while plates 28 have been depicted herein as being corrugated, other configurations may be employed. Thus, any plate having a plurality of protuberances extending outwardly therefrom may function to isolate adjacent ink jet modules from one another. These protuberances could be dimples, grooves, creases, or any other such arrangement.

In recapitulation, it is clear that the ink jet printing machine of the present invention includes a linear array of nozzles with adjacent nozzles being isolated from one another to prevent interaction therebetween when a selected nozzle is energized. Isolation of adjacent nozzles is achieved by interposing a damping medium therebetween. This damping medium in conjunction with minimum contact tends to prevent cross coupling. Contact between adjacent nozzles is minimized by employing point contact rather than area contact with the remaining space containing air to act as a damping medium therebetween. In this way, interaction is minimized and only the selected nozzle will be energized rather than both the selected nozzle and adjacent nozzles.

It is, therefore, evident that there has been provided in accordance with the present invention an ink jet printing machine in which adjacent nozzles are isolated from one another preventing cross coupling therebetween. This machine fully satisfies the advantages hereinbefore set forth. While this invention has been described in conjunction with specific embodiments thereof, it is evident that many alternatives, modifications and variations will be apparent to those skilled in the art. Accordingly, it is intended to embrace all such alternatives, modifications and variations as fall within the spirit and broad scope of the appended claims.

What is claimed is:

1. An ink jet printing machine, including:

an array of nozzles;

a plurality of housings for storing a supply of writing fluid for each nozzle of said array of nozzles, each of said plurality of housings having a channel therein in communication with one of the nozzles of said array of nozzles;

a plurality of transducers, each of said transducers being positioned closely adjacent to the channel in one of said plurality of housings so that activation of said transducer ejects droplets of writing fluid from the nozzle in communication with the channel adjacent said transducer; and two corrugated members interposed between adjacent housings of said plurality of housings for isolating each of said array of nozzles from one another to prevent interaction between said array of nozzles from energizing nozzles other than the selected nozzles of said array of nozzles wherein the apexes of the intersecting walls of one of said corrugated members engage the apexes of intersecting walls of an adjacent corrugated member.

2. A printing machine according to claim 1, wherein said transducer includes a piezoelectric member.

3. A printing machine according to claim 1, wherein the apexes of the intersecting walls of said corrugated member engaging the adjacent corrugated member have apexes thereof interposed therebetween and spaced from the adjacent corrugated member.

4. A printing machine according to claim 1, wherein the apexes of the intersecting walls of said corrugated member are substantially normal to one another.

* * * * *